United States Patent
Qu (10) Patent No.: US 8,151,128 B2
(45) Date of Patent: Apr. 3, 2012

(54) COMPUTER SYSTEM POWER SOURCE WITH IMPROVED LIGHT-LOAD EFFICIENCY

(75) Inventor: Dayu Qu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 888 days.

(21) Appl. No.: 11/867,360

(22) Filed: Oct. 4, 2007

(65) Prior Publication Data

US 2008/0307242 A1    Dec. 11, 2008

Related U.S. Application Data

(60) Provisional application No. 60/933,447, filed on Jun. 5, 2007.

(51) Int. Cl.
*G06F 1/32* (2006.01)

(52) U.S. Cl. .......... 713/324; 713/300; 713/320

(58) Field of Classification Search .......... 713/300, 713/320, 323, 324
See application file for complete search history.

(56) References Cited

U.S. PATENT DOCUMENTS

| | | | |
|---|---|---|---|
| 2002/0036910 A1* | 3/2002 | Yang | 363/21.07 |
| 2005/0128515 A1* | 6/2005 | Ohno | 358/1.15 |
| 2006/0267565 A1* | 11/2006 | Louvel et al. | 323/282 |
| 2007/0279024 A1* | 12/2007 | Falvey et al. | 323/280 |

FOREIGN PATENT DOCUMENTS

WO    2005085969 A1    9/2005

OTHER PUBLICATIONS

Wei, Jia et al., "Two-Stage Voltage Regulator for Laptop Computer CPU's and the Corresponding Advanced Control Schemes to Improve Light-Load Performance", pp. 1294-1300, BNSDOCID, 10704799A_I.
Chen, Yi et al., "A Simulation-Based Comparison of Direct and Indirect Current-Sharing Methods", pp. 2746-2752, 2004 35th Anual IEEE Power Electronics Specialists Conference, Aachen Germany, 2004.

* cited by examiner

*Primary Examiner* — Dennis M Butler
(74) *Attorney, Agent, or Firm* — Park, Vaughan, Fleming & Dowler LLP; Anthony Jones (57) ABSTRACT

Embodiments of the present invention provide a system that supplies power in a computer system. The system includes a power adapter coupled to a source of electrical power and a set of a set of power consumers coupled to a power bus in the computer system. A full-power mechanism coupled between the power adapter and the power bus supplies power for the power consumers while the computer system is operating in a full-power mode. A low-power mechanism coupled between the power adapter and the power bus in parallel with the power mechanism supplies power for the power consumers while the computer system is in operating in a low-power mode.

22 Claims, 11 Drawing Sheets

| PRODUCT | CATEGORY | IDLE (SEE NOTE 7) | | | SLEEP (S3) WAKE ON LAN DISABLED | | | SLEEP (S3) WAKE ON LAN ENABLED | | | STANDBY (S5) NO WAKE ON LAN | | |
|---|---|---|---|---|---|---|---|---|---|---|---|---|---|
| | | LIMIT | RESULTS | VERDICT | LIMIT | RESULTS | VERDICT | LIMIT | RESULTS | VERDICT | LIMIT | RESULTS | VERDICT |
| MAC MINI 2 X 256 MB MEMORY | DESKTOP CAT. A | ≤ 50 W | 22.6 W | PASS | ≤ 4.0 W | 2.4 W | PASS | ≤ 4.7 W | 2.8 W | PASS | ≤ 2 W | 1.4 W | PASS |
| iMAC 17" 2 x 256 MB MEMORY | DESKTOP CAT. A | ≤ 50 W | 29.5 W | PASS | ≤ 4.0 W | 3.2 W | PASS | ≤ 4.7 W | 3.5 W | PASS | ≤ 2 W | 2.6 W | FAIL |
| iMAC 20" 1 x 1 GB MEMORY | DESKTOP CAT. A | ≤ 50 W | 36.5 W | PASS | ≤ 4.0 W | 2.7 W | PASS | ≤ 4.7 W | 3.2 W | PASS | ≤ 2 W | 2.3 W | FAIL |
| iMAC 24" 2x 512 MB MEMORY | DESKTOP CAT. A | ≤ 50 W | 39.1 W | PASS | ≤ 4.0 W | 3.9 W | PASS | ≤ 4.7 W | 3.7 W | PASS | ≤ 2 W | 2.4 W | FAIL |
| MACBOOK 13" 2 X 1 GB MEMORY | NOTEBOOK CAT. A | ≤ 14 W | 11.4 W | PASS | ≤ 1.7 W | 2.2 W | FAIL | ≤ 2.4 W | 2.8 W | FAIL | ≤ 1 W | 1.6 W | FAIL |
| MACBOOK PRO 15" 2 X 1 GB MEMORY | NOTEBOOK CAT. B | ≤ 20 W | 19.6 W | PASS | ≤ 1.7 W | 2.1 W | FAIL | ≤ 2.4 W | 2.5 W | FAIL | ≤ 1 W | 1.3 W | FAIL |
| MACBOOK PRO 17" 2x 512 MB MEMORY | NOTEBOOK CAT. B | ≤ 20 W | 15.2 W | PASS | ≤ 1/7 W | 2.1 W | FAIL | ≤ 2.4 W | 2.3 W | PASS | ≤ 1 W | 1.6 W | FAIL |

COMPUTER SYSTEM POWER SOURCE WITH IMPROVED LIGHT-LOAD EFFICIENCY

RELATED APPLICATIONS

This application claims priority under 35 U.S.C. §119(e) to U.S. Provisional Application Ser. No. 60/933,447, filed on Jun. 5, 2007, the contents of which are herein incorporated by reference.

BACKGROUND

1. Field of the Invention

Embodiments of the present invention relate to power sources for computer systems. More specifically, embodiments of the present invention relate to power sources for computer systems with improved light-load efficiency.

2. Related Art

Energy Star is a government-backed program which has promulgated power consumption standards to help businesses and individuals protect the environment through energy efficiency. With the help of Energy Star, in 2006, Americans saved an estimated $6 billion on power bills.

Figure 1:
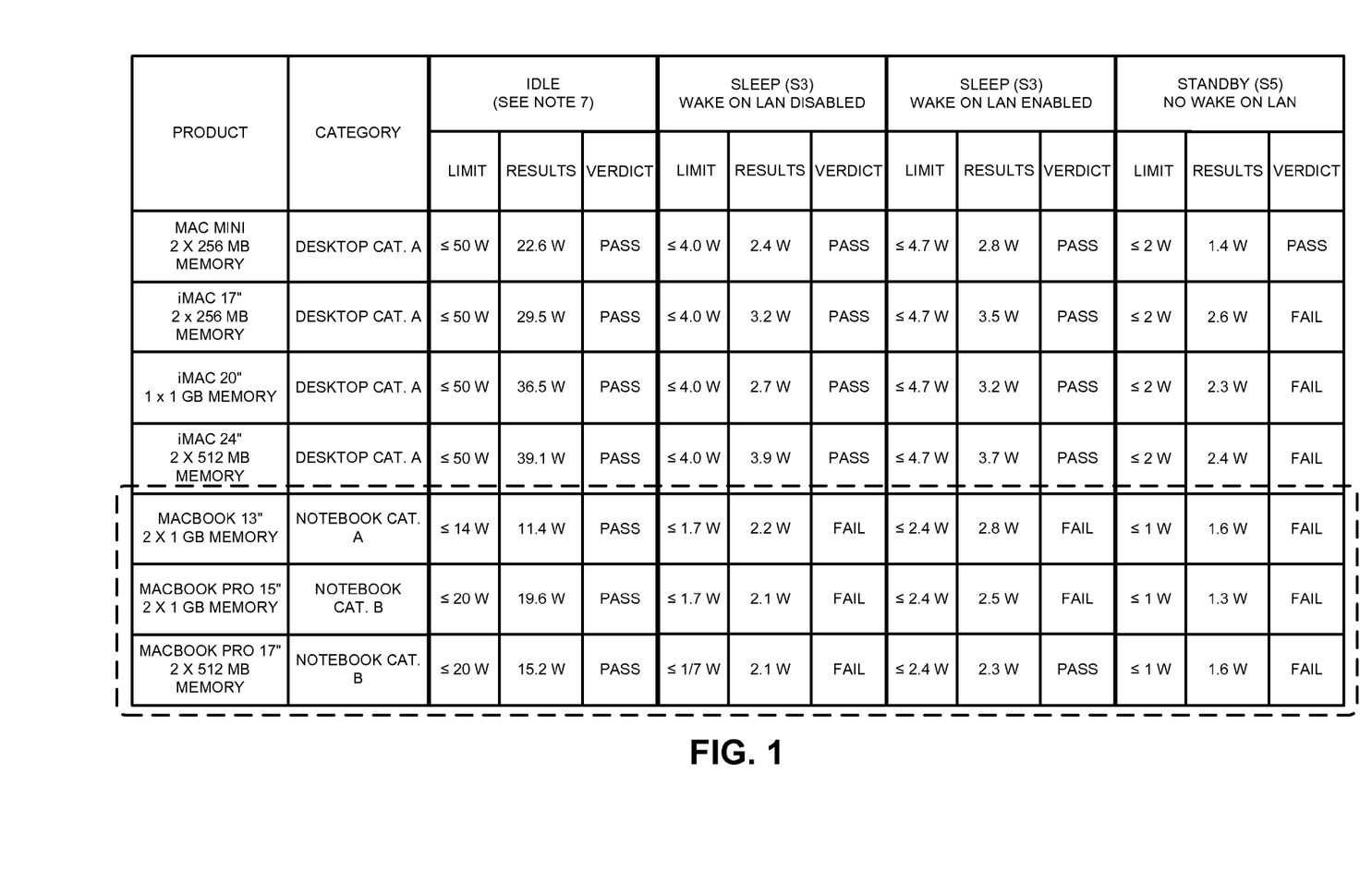
FIG. 1 presents a table of power consumption measurements.

The Energy Star standard for the power consumption of computer systems will soon be updated to version 4.0. This new Energy Star standard sets more stringent power consumption limits for "sleep," "standby," and "idle" operating modes. Many current computer systems do not comply with the Energy Star 4.0 power consumption limits. For example, as shown in FIG. 1, Apple Inc.'s MacBook™ 13" (where the dimension in inches is the size of the MacBook's display screen) and MacBook Pro™ 15" and 17" fail several substandards within the Energy Star 4.0 standard. More specifically, both the MacBook and the MacBook Pro fail the Energy Star power consumption standard in both sleep mode and idle (or "standby") mode.

Computer power system designers have spent a considerable amount of time optimizing the power supply systems in computer systems such as the MacBook. Unfortunately, most of the optimizations have been directed at "full power" operation. Hence, these optimizations generally have little effect on the computer system's power conversion efficiency in the low-power modes (and can even degrade the computer system's power conversion efficiency in these modes).

Figure 2A:
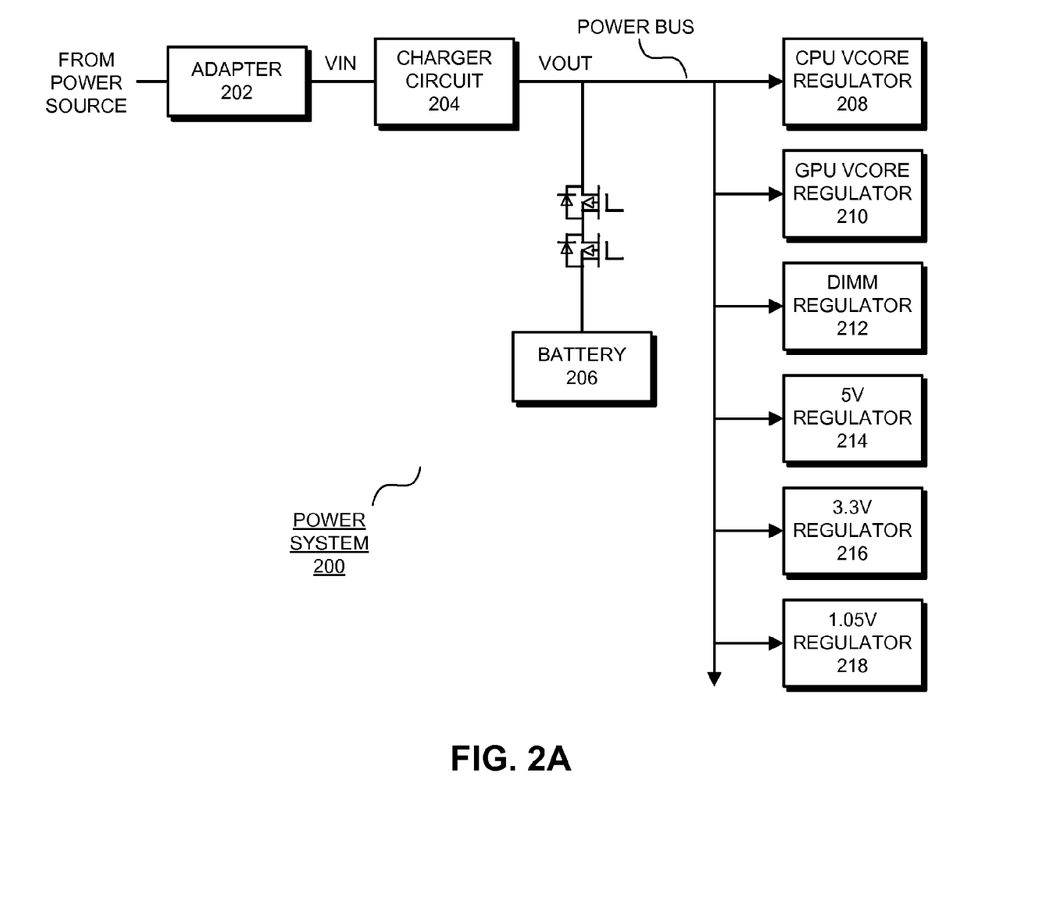
FIG. 2A presents block diagram of a power system.

FIG. 2A presents a block diagram of a power system 200. As shown in FIG. 2A, power system 200 includes adapter 202, charger circuit 204, battery 206, and voltage regulators 208-218. Adapter 202 converts an AC signal from a power source (e.g., a common 120 VAC electrical outlet) to a 16.5 VDC signal which is in turn converted by charger circuit 204 into a 12.6 VDC signal. The 12.6 VDC signal is then used as an input for voltage regulators 208-218 as well as for charging battery 206. (Note that battery 206 provides power for the system when adapter 202 is not coupled to a power source. Because battery 206 does not output a constant voltage, regulators 208-218 are typically designed to operate across a range of input voltage levels, (e.g., between 9 V and 12.6 V).)

Figure 2B:
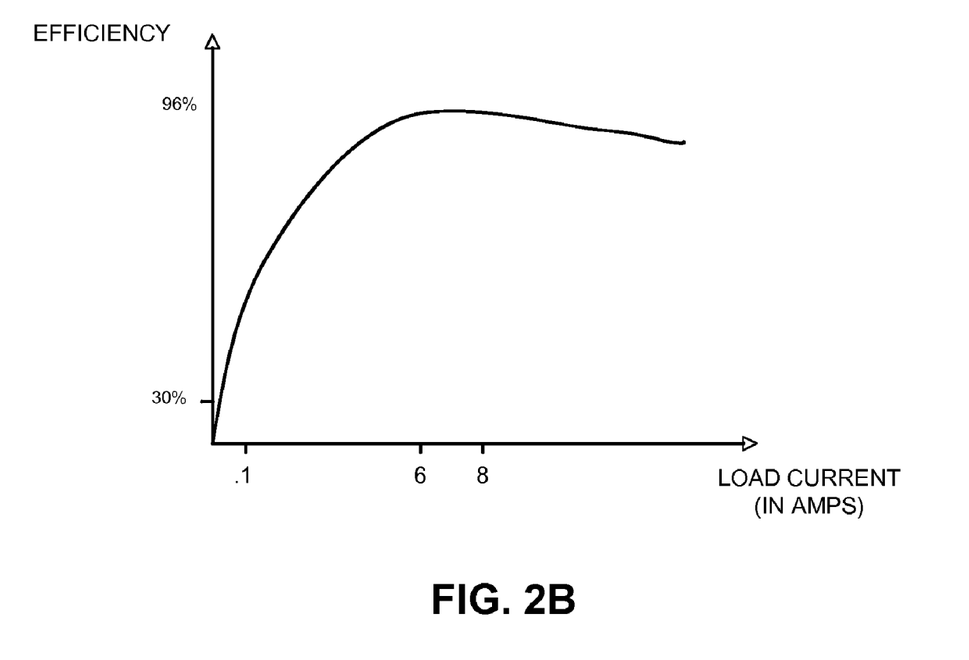
FIG. 2B presents an exemplary power conversion efficiency curve for the power system in FIG. 2A.

FIG. 2B presents an exemplary power conversion efficiency curve (not to scale) for the power system in FIG. 2A. As can be seen in FIG. 2B, the power system has been optimized for full-power operation. Hence, the power conversion efficiency is approximately 90% for full-power operating currents of 6-8 A. Unfortunately, the power conversion efficiency drops below 40% for low-power currents below 100 mA.

Hence, what is needed is a power system for a computer system that operates without the above-described problems.

SUMMARY

Embodiments of the present invention provide a system that supplies power in a computer system. The system includes a power adapter coupled to a source of electrical power and a set of power consumers coupled to a power bus in the computer system. A full-power mechanism coupled between the power adapter and the power bus supplies power for the power consumers while the computer system is operating in a full-power mode. A low-power mechanism coupled between the power adapter and the power bus in parallel with the power mechanism supplies power for the power consumers while the computer system is operating in a low-power mode.

In some embodiments, the low-power mechanism is a buck converter, a boost converter, a single-ended primary inductor converter (SEPIC), or another switched-mode power supply.

In some embodiments, the low-power mechanism is a MOSFET transistor, a bipolar junction transistor, a mechanical switch, or another type of switching element.

In some embodiments, the system includes a voltage-reduction mechanism coupled in series with the switching element, wherein the voltage-reduction mechanism reduces the voltage to a level suitable for the power consumers.

In some embodiments, the low-power mechanism is a diode in series with a voltage-reduction mechanism, wherein the voltage-reduction mechanism reduces the voltage to a level suitable for the power consumers.

In some embodiments, the system asserts a low-power control signal to enable the low-power mechanism when the computer system commences operation in low-power mode and deasserts the low-power control signal to disable the low-power mechanism when the computer system commences operation in full-power mode.

In some embodiments, the system asserts a full-power control signal to enable the full-power mechanism when the computer system commences operation in full-power mode and deasserts the full-power control signal to disable the full-power mechanism when the computer system commences operation in low-power mode.

In some embodiments, the system temporarily asserts the full-power control signal and the low-power control signal to enable both the full-power mechanism and the low-power mechanism as the computer system transitions between the low-power mode and the full-power mode.

In some embodiments, the system includes a voltage-sensitive mechanism on the output of the full-power mechanism. In these embodiments, when supplying power for the power consumers, the low-power mechanism outputs a predetermined voltage on the power bus. Upon detecting the predetermined voltage, the voltage-sensitive mechanism disables the full-power mechanism.

In some embodiments, the low-power modes include: (1) a sleep mode; (2) an idle mode; and/or (3) a standby mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 3:
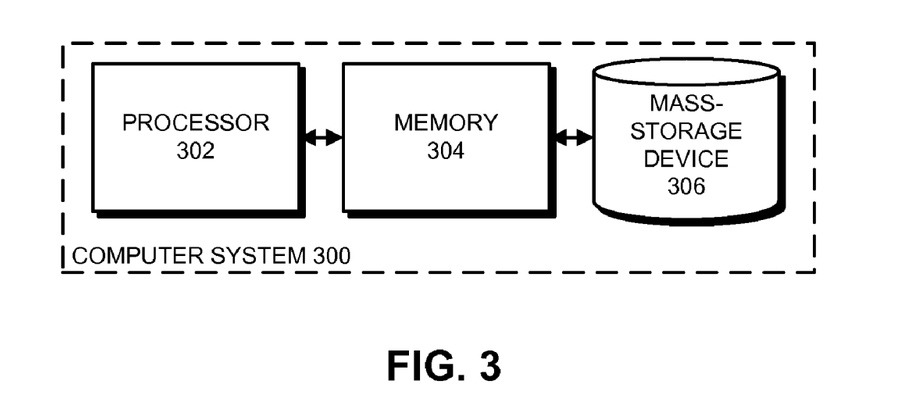
FIG. 3 presents a block diagram of a computer system in accordance with embodiments of the present invention.

FIG. 3 presents a block diagram of a computer system 300 in accordance with embodiments of the present invention. Computer system 300 includes processor 302, memory 304, and mass-storage device 306. In some embodiments of the present invention, computer system 300 is a general-purpose computer system that supports low-power operating modes, including sleep, idle, and/or standby modes. During these low-power operating modes, some or all of the functions of computer system 300 are disabled in order to conserve power. For example, when operating in a low-power mode, computer system 300 may disable processor 302, memory 304, mass-storage device 306, and/or other devices such as monitors and peripheral devices (not shown).

Processor 302 is a central processing unit (CPU) that processes instructions for computer system 300. For example, processor 302 can be a microprocessor, a device controller, or another type of computational engine. Memory 304 is volatile memory that stores instructions and data for processor 302 during operation of computer system 300. For example, memory 304 can include DRAM, SDRAM, or another form of volatile memory. Mass-storage device 306 is a non-volatile storage device that stores instructions and data for processor 302. For example, mass-storage device 306 can be a hard disk drive, a flash memory, an optical drive, or another non-volatile storage device.

Note that although we describe embodiments of the present invention using computer system 300, alternative embodiments can be used within other types of computing systems.

Power System

Figure 4:
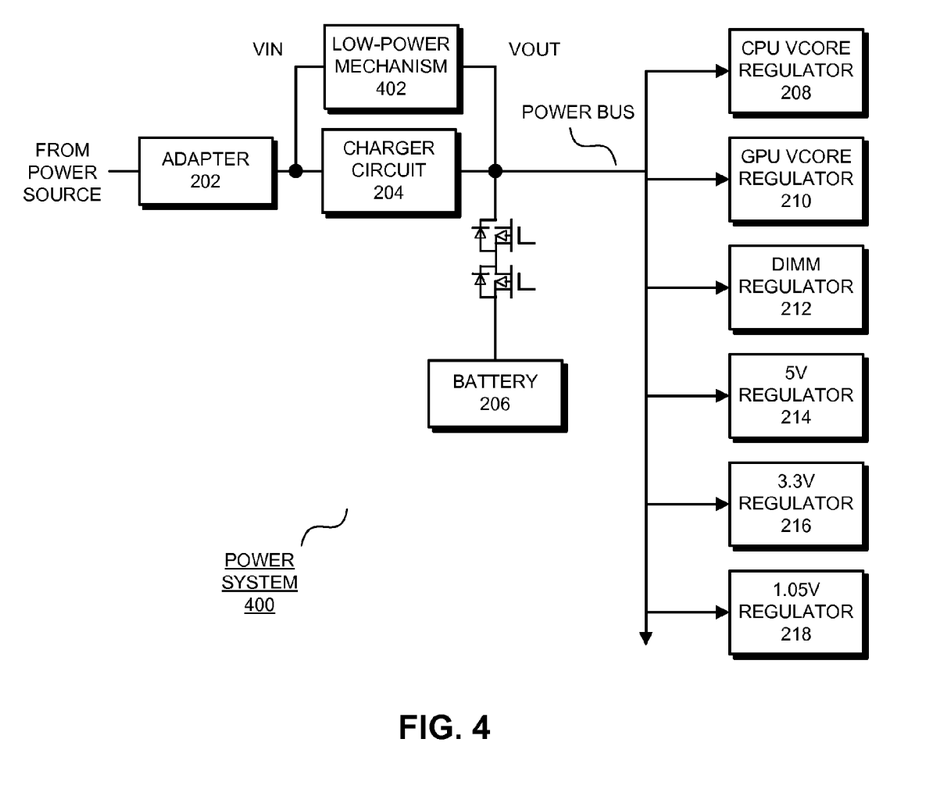
FIG. 4 presents block diagram of a power system in accordance with embodiments of the present invention.

FIG. 4 presents a block diagram of a power system 400 in accordance with embodiments of the present invention. Power system 400 includes adapter 202, charger circuit 204, low-power mechanism 402, battery 206, and voltage regulators 208-218.

Charger circuit 204 provides power for regulators 208-218 as well as for charging battery 206 during full-power mode. Charger circuit 204 is optimized for operation in full-power mode, so the power conversion efficiency of charger circuit 204 is significantly higher during full-power operation than during operation in a low-power mode.

Low-power mechanism 402 provides power for regulators 208-218 as well as for charging battery 206 during the low-power modes. Low-power mechanism 402 is optimized for low-power operation, so the power conversion efficiency of low-power mechanism 402 is significantly higher during low-power operation. Because power system 400 uses charger circuit 204 to provide power during full-power mode, but uses low-power mechanism 402 to provide power during the low-power modes, the overall power conversion efficiency of power system 400 is greater than the power conversion efficiency of a power system that does not provide two power mechanisms.

In some embodiments, low-power mechanism 402 accepts an input control signal that is asserted as the computer enters a low-power mode and is deasserted when the computer returns to full-power mode. More specifically, when the control signal is asserted, low-power mechanism 402 is activated, and when the control signal is deasserted, low-power mechanism 402 is deactivated.

In some embodiments, charger circuit 204 also accepts the control signal as an input. In these embodiments, when the control signal is asserted, charger circuit 204 is disabled, and when the control signal is deasserted, charger circuit 204 is enabled. Hence, the control signal toggles the circuit element that provides power as the computer system switches between the low-power modes and the full-power mode.

In other embodiments, the signal on the power bus is used to control the switching between charger circuit 204 and low-power mechanism 402 upon entering and leaving a low-power mode. In these embodiments, during the low-power modes, the signal output by low-power mechanism 402 onto the power bus is higher voltage than the signal output by charger circuit 204, which disables charger circuit 204. For example, if charger circuit 204 maintains 12.6 V on the power bus during operation in full-power mode, low-power mechanism 402 may output 13 V. In these embodiments, charger circuit 204 includes circuit on the output (e.g., a diode or the equivalent) that prevents charger circuit 204 from outputting current on the power bus when the voltage on the power bus exceeds 12.6 V.

Low-Power Mechanism

In some embodiments of the present invention, low-power mechanism 402 is a low-dropout regulator (LDO). Generally, an LDO is a DC linear voltage regulator. The main components of an LDO are a power FET and a differential amplifier. One input of the differential amplifier receives a percentage of the output (as determined by the ratio of a pair of resistors within the LDO). The second input to the differential amplifier is from a stable voltage reference. If the output voltage rises too high relative to the reference voltage, the drive to the power FET changes to maintain a constant output voltage.

Generally, the power conversion efficiency of the LDO can be expressed as LDOefficiency=$P_o/(P_o+P_{loss})$, where $P_{loss}=V_{drop}*I_{out}$ and $P_o=V_{out}*I_{out}$. Because LDO efficiency is independent of current, LDO efficiency can be calculated more simply as LDOefficiency=$V_{out}/V_{in}$. For example, assuming that $V_{in}$ is output voltage of adapter 202, which is 16.5 V during light load conditions, and that the LDO's $V_{out}$ is set to 13.5 V. The LDO's efficiency is:

13.5 V/16.5 V=82%

Figure 5:
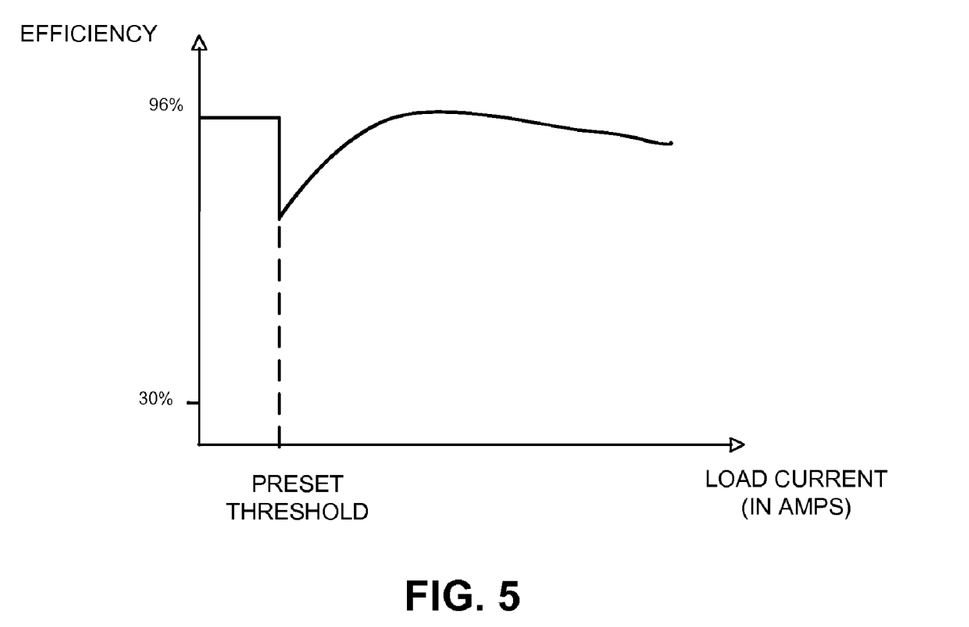
FIG. 5 presents a power conversion efficiency graph for a power system including an LDO in accordance with embodiments of the present invention.

The LDO provides a linear power conversion efficiency response in the range of low-power current values. For example, FIG. 5 presents a power conversion efficiency graph for a power system including an LDO in accordance with embodiments of the present invention. As shown in FIG. 5, the power conversion efficiency profile of power system 400 is linear at approximately 82% in a low-power range of currents. Outside of the low-power range of currents, low-power mechanism 402 is disabled, charger circuit 204 is enabled, and the power conversion efficiency profile follows the profile for a charger circuit that is optimized for operation in the 6-8 A full-power mode.

In some embodiments of the present invention, low-power mechanism 402 is a switched-mode power supply. For example, low-power mechanism 402 can be a buck converter (or "buck circuit"), a boost converter, a single-ended primary inductor converter (SEPIC), or another DC to DC converter.

Figure 6A:
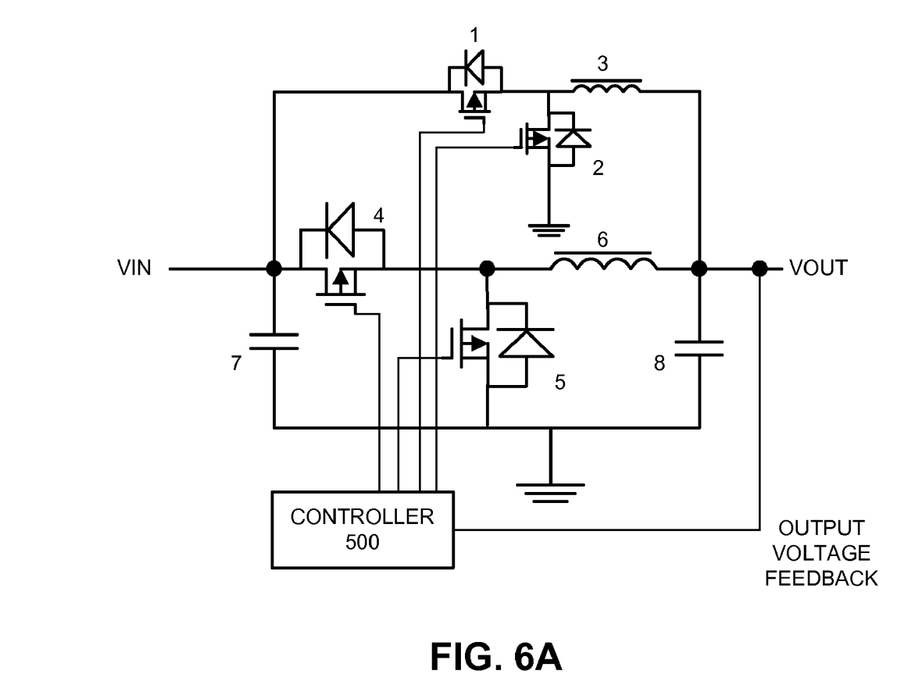
FIG. 6A presents a circuit diagram illustrating a combined power stage including control switches in accordance with embodiments of the present invention.

FIG. 6A presents a circuit diagram illustrating a combined power stage including control switches in accordance with embodiments of the present invention. Components 4, 5, and 6 in FIG. 6A form a primary buck circuit (i.e., charger circuit 204 as shown in FIG. 4) within the combined power stage. This primary buck circuit is optimized to have high power conversion efficiency during operation in the full-power mode. The primary buck circuit operates when load current is above a preset threshold. (Note that using a FET for component 5 in the primary buck circuit enables synchronous rectification for high performance. Also note that component 5 in the primary buck circuit can be replaced by a diode to simplify the circuit.)

Figure 6B:
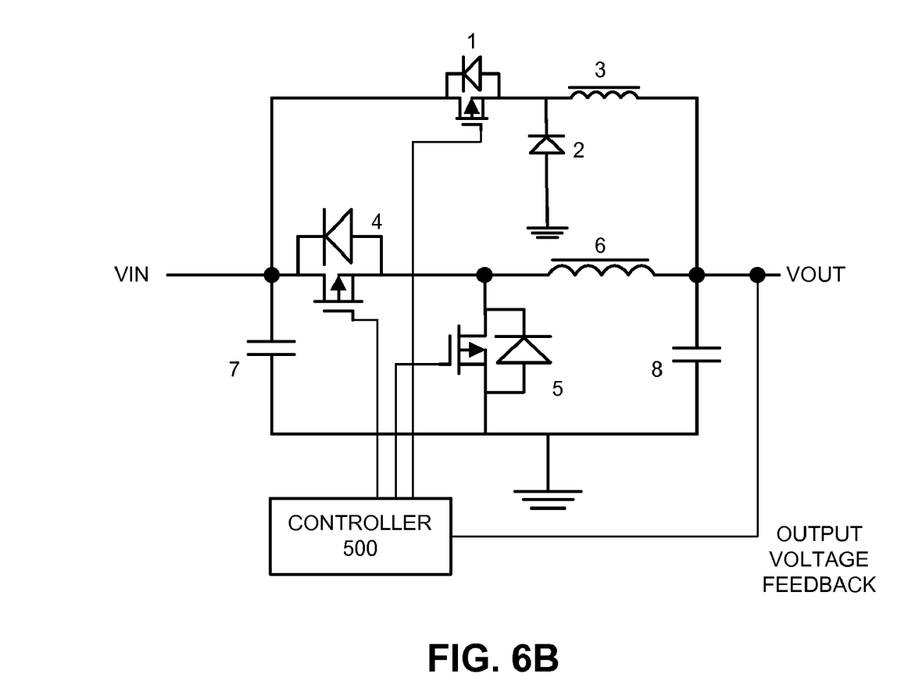
FIG. 6B presents a circuit diagram illustrating a simplified combined power stage including control switches in accordance with embodiments of the present invention.

Components 1, 2, and 3 in FIG. 6A form a secondary or "baby" buck circuit within the combined power stage (i.e., low-power mechanism 402 as shown in FIG. 4). This baby buck circuit is optimized to have high power conversion efficiency during operation in a low-power mode. The baby buck circuit operates when load current is below a preset threshold. (Note that component 2 the baby buck circuit can be replaced by a diode, as shown in FIG. 6B, to simplify the circuit.)

For example, in some embodiments of the present invention, the preset threshold level for the load current can be set at 200 mA. Hence, when the load current is less than 200 mA, only the baby buck circuit operates (i.e., the primary buck circuit is disabled). However, when the load current is more than 200 mA, the primary buck circuit is enabled.

In alternative embodiments of the present invention, there is a small range of currents where both the baby buck circuit and the primary buck circuit are enabled. For example, the baby buck circuit may be enabled up to 250 mA, while the primary buck circuit is enabled down to 150 mA. The overlapping range can smooth the transition between the baby buck circuit and the primary buck circuit.

In some embodiments of the present invention, the baby buck circuit and the primary buck circuit are controlled by a single controller. For example, as shown in FIG. 6A, controller 500 controls semiconductor switches 1, 2, 4, and 5. (Although semiconductor switches 1, 2, 4, and 5 are illustrated as field-effect transistors (FETs) in FIG. 6A, alternative embodiments can use other types of switches, such as mechanical switches.)

Figure 6C:
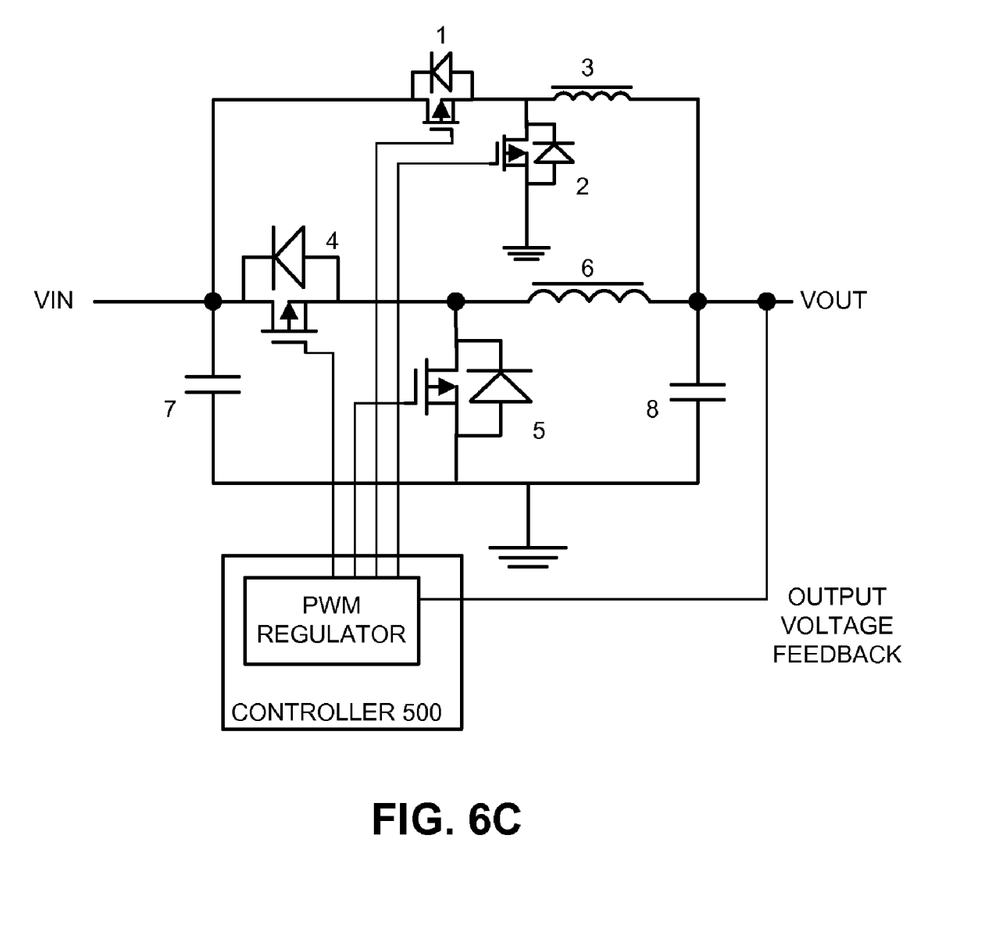
FIG. 6C presents a circuit diagram illustrating a combined power stage where both a primary buck circuit and a baby buck circuit are controlled using a single pulse-width modulated (PWM) regulator in a controller.

In some embodiments of the present invention, the baby buck circuit and the primary buck circuit are controlled by a single control loop in controller 500. For example, as shown in FIG. 6C, both the baby buck circuit and the primary buck circuit can be controlled using a single pulse-width modulated (PWM) control loop in controller 500.

Figure 6D:
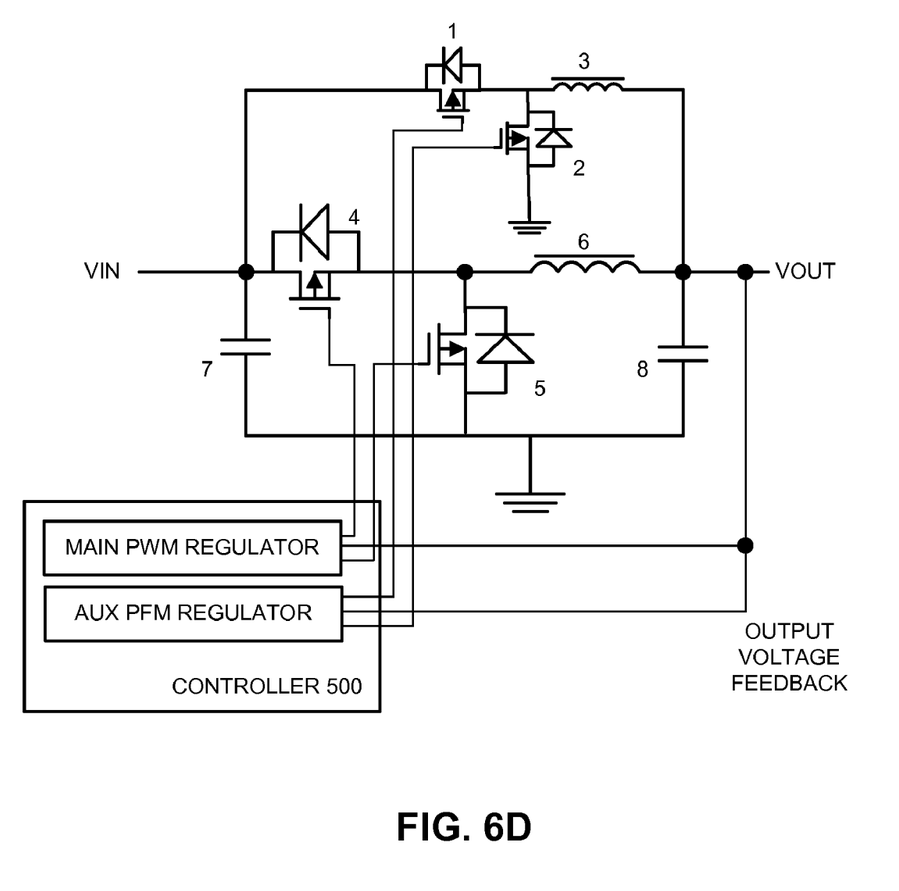
FIG. 6D presents a circuit diagram illustrating a combined power stage where the baby buck circuit is controlled by a pulse-frequency modulated (PFM) regulator, while the primary buck circuit is controlled by a separate PWM regulator.

In alternative embodiments of the present invention, the baby buck circuit and the primary buck circuit can be controlled by different control loops in controller 500. For example, as shown in FIG. 6D, the baby buck circuit can be controlled by a pulse-frequency modulated (PFM) regulator, while the primary buck circuit is controlled by a separate PWM regulator.

In some embodiments of the present invention, controller 500 includes a load current monitor circuit designed to monitor the load current and to control the transition between the baby buck circuit and the primary buck circuit. This load current monitor prevents excessively frequent transitions between the buck circuits when the load current is near the preset threshold (200 mA in the example above).

Figure 6E:
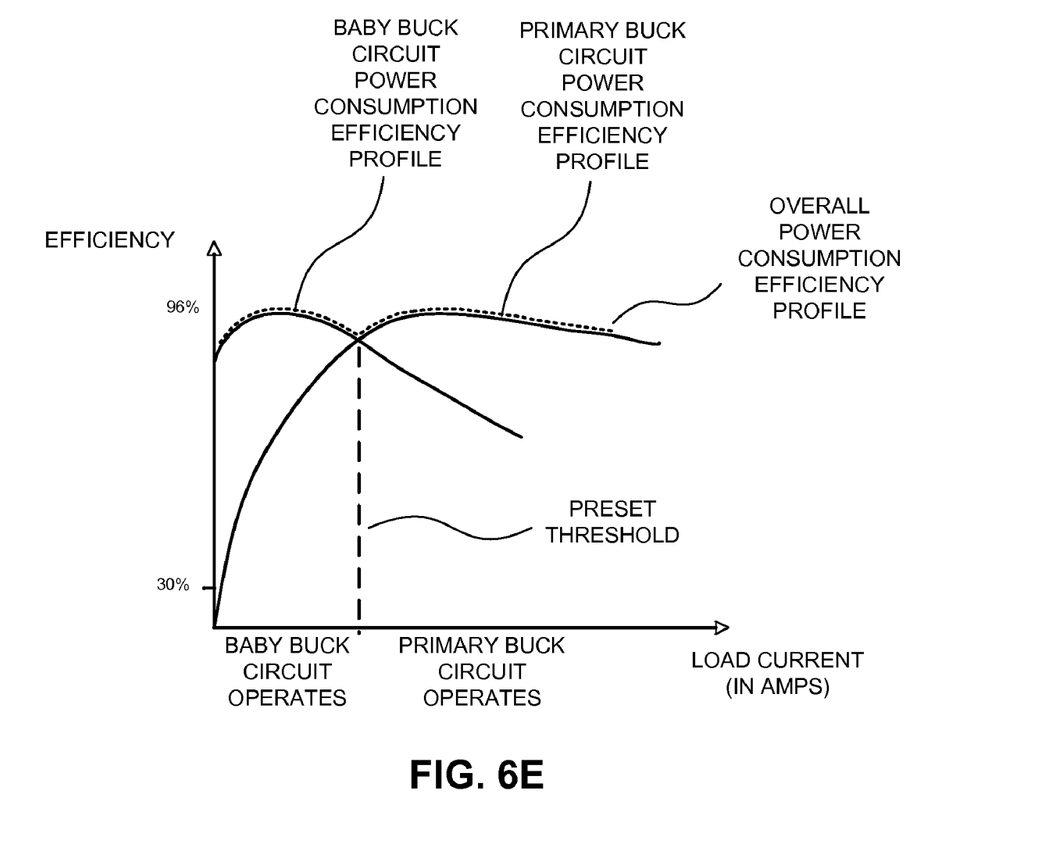
FIG. 6E presents a power conversion efficiency graph for a combined power stage in accordance with embodiments of the present invention.

FIG. 6E presents a power conversion efficiency graph for a combined power stage in accordance with embodiments of the present invention. As shown in FIG. 6E, at lower current values, the baby buck circuit's power conversion efficiency is higher than the primary buck circuit's. On the other hand, at higher current values, the primary buck circuit's power conversion efficiency is higher. Hence, using the baby buck circuit to provide power below the preset threshold, and using the primary buck circuit to provide power above the preset threshold results in an improved overall power conversion efficiency. (The overall power conversion efficiency profile can be seen as the dotted line tracing the separate power conversion efficiency profiles.)

Figure 7:
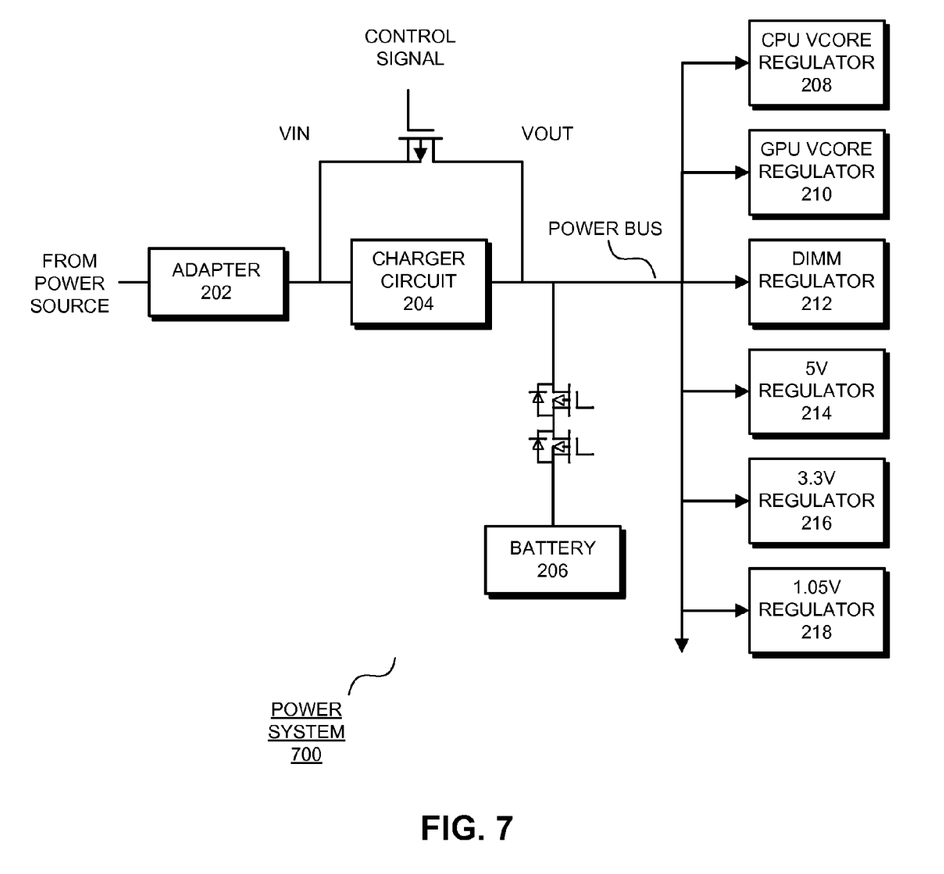
FIG. 7 presents a block diagram of a power system that includes a semiconductor switch as the low-power mechanism in accordance with embodiments of the present invention.

In some embodiments of the present invention, low-power mechanism 402 includes a semiconductor or mechanical switch. For example, FIG. 7 presents a block diagram of a power system 700 that includes a semiconductor switch as low-power mechanism 402 in accordance with embodiments of the present invention. In these embodiments, the power conversion efficiency can be nearly 100% (because there is very little voltage drop across the switch). Embodiments that use a switch, however, also place approximately 16.5 V on the power bus. Because the power consumers are typically tuned to operate between 9 V and 12.6 V, adjustments may need to be made to the power consumers to allow them to operate at 16.5 V.

To avoid making adjustments to power consumers, in some embodiments of the present invention, a resistor can be coupled in series with the semiconductor switch, creating the requisite voltage drop (at a cost in power consumed in the series-coupled resistor). For example, assuming an adapter output voltage of 16.6 V and a system load current in the "off" (or standby) mode of 20 mA, the series resistor can be selected to be 200 ohm. Given this configuration, in the off mode, the power bus voltage is 16.6 V−20 mA*200 ohm=12.6 V.

In some embodiments of the present invention, low-power mechanism 402 includes a diode and a resistor in series. The diode-resistor combination provides power at a sufficient power conversion efficiency (at the cost of consuming power as heat in the resistor).

Controlling a Power System

Figure 8:
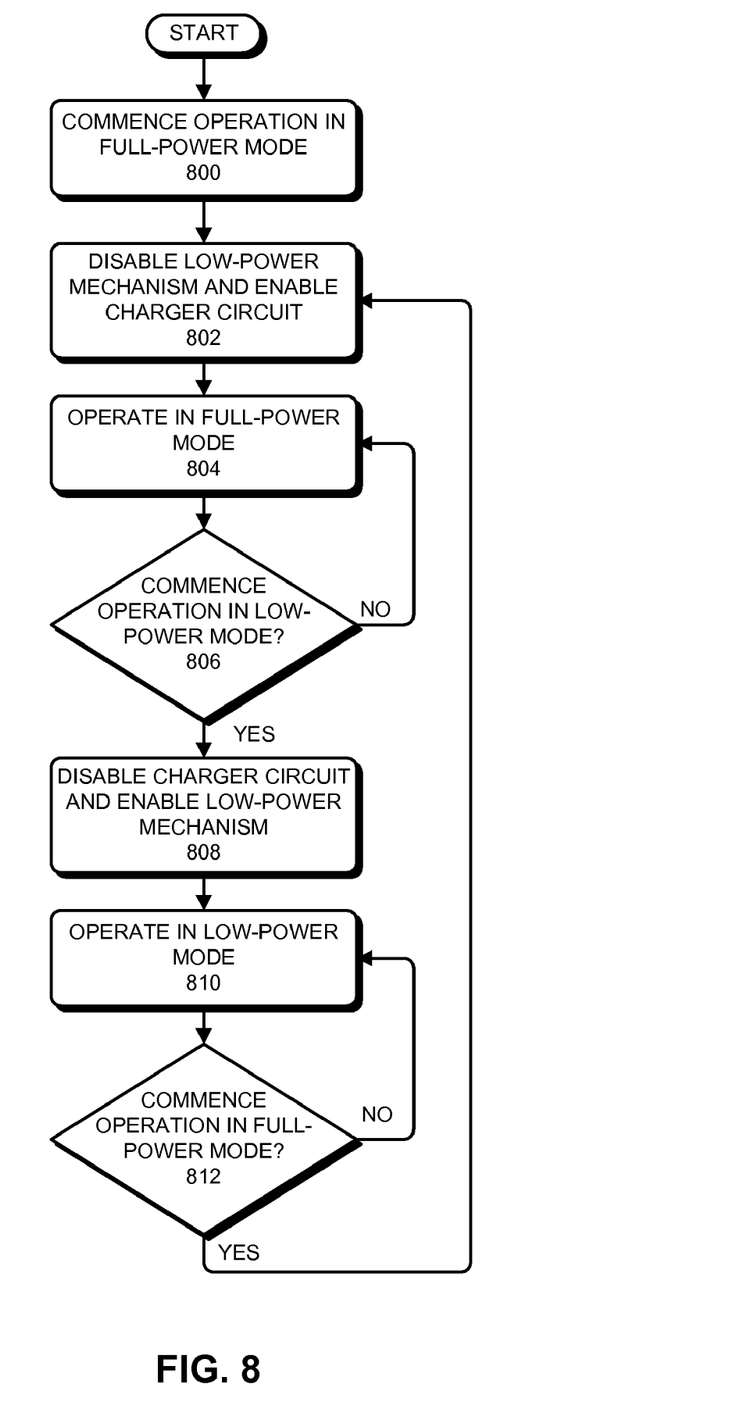
FIG. 8 presents a flowchart illustrating a process of controlling a power system in accordance with embodiments of the present invention.

FIG. 8 presents a flowchart illustrating a process of controlling a power system in accordance with embodiments of the present invention. In the following description, we assume that the power system includes charging mechanism 202 and low-power mechanism 402 (as illustrated in FIG. 4).

The process starts when a system commences operation in full-power mode (step 800). For example, the system can commence operation in full-power mode when the system initially starts. Upon commencing operation in the full-power mode, the system disables a low-power mechanism 402 and enables charger circuit 202 (step 802). By configuring charger circuit 202 and low-power mechanism 402 in this way, the system has configured the power system so that charger circuit 202 provides the power for the system in the full-power mode. The system then operates in full-power mode (step 804).

During operation in full-power mode, the system determines if operation in a low-power mode is to commence (step 806). For example, the system may enter an "idle" mode where one or more functions of the system are disabled to conserve power. If the system is not commencing operation in the low-power mode, the system returns to step 804 to continue operation in full-power mode.

Otherwise, upon entering the low-power mode, the system disables charger circuit 202 and enables low-power mechanism 402 (step 808). By configuring charger circuit 202 and low-power mechanism 402 in this way, the system has configured the power system so that low-power mechanism 402 provides the power for the system in the low-power mode. The system then operates in low-power mode (step 810).

During operation in low-power mode, the system determines if operation in the full-power mode is to commence (step 812). For example, the system may leave the "idle" mode to return to a full-power mode when the system is in use. If the system is not commencing operation in the full-power mode, the system returns to step 810 to continue operation in low-power mode.

Otherwise, the system returns to step 802 to disable low-power mechanism 402 and enable charger circuit 202. The system then operates in full-power mode (step 804).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that supplies power in a computer system, comprising:
a power adapter coupled to a source of electrical power;
a set of power consumers coupled to a power bus in the computer system;
a full-power mechanism coupled between the power adapter and the power bus, wherein the full-power mechanism supplies power for the power consumers while the computer system is operating in a full-power mode; and
a low-power mechanism coupled between the power adapter and the power bus in parallel with the full-power mechanism, wherein the low-power mechanism supplies power for the power consumers while the computer system is operating in a low-power mode, and wherein the low-power mechanism comprises a switching element coupled in series with a voltage-reduction mechanism that reduces the voltage to a level suitable for the power consumers;
wherein the full-power mechanism and the low-power mechanism are both enabled for a predetermined range of an output current while supplying power to the power consumers, and wherein, as the computer system transitions from the low-power mode to the full power mode, the low-power mechanism is disabled upon detecting that the output current is at a first predetermined threshold current within the range.

2. The apparatus of claim 1, wherein the low-power mechanism comprises a buck converter, a boost converter, a single-ended primary inductor converter (SEPIC), or another switched-mode power supply.

3. The apparatus of claim 1, wherein the switching element includes at least one of a MOSFET transistor, a bipolar junction transistor, a mechanical switch, or another type of switching element.

4. The apparatus of claim 1, wherein the low-power mechanism comprises a diode in series with the voltage-reduction mechanism.

5. The apparatus of claim 1, further comprising a control mechanism that asserts a control signal to enable the low-power mechanism when the computer system commences operation in low-power mode and to disable the low-power mechanism when the computer system commences operation in full-power mode.

6. The apparatus of claim 5, wherein the control mechanism asserts a second control signal to disable the full-power mechanism when the computer system commences operation in low-power mode and to enable the full-power mechanism when the computer system commences operation in full-power mode.

7. The apparatus of claim 1, further comprising:
a voltage-sensitive mechanism on the output of the full-power mechanism;
wherein when supplying power for the power consumers, the low-power mechanism outputs a predetermined voltage on the power bus; and
wherein upon detecting the predetermined voltage, the voltage-sensitive mechanism disables the full-power mechanism.

8. The apparatus of claim 1, wherein, as the computer system transitions from the full-power mode to the low-power mode, the full-power mechanism is disabled upon detecting that the output current is at a second predetermined threshold within the range, wherein the first threshold current is higher than the second threshold current, and wherein the second threshold current is greater than zero.

9. A computer system, comprising:
a processor;
a memory coupled to the processor, wherein the memory stores instructions and data for the processor;
a power adapter coupled to a source of electrical power;
a set of power consumers coupled to a power bus in the computer system;
a full-power mechanism coupled between the power adapter and the power bus, wherein the full-power mechanism supplies power for the power consumers while the computer system is operating in a full-power mode; and
a low-power mechanism coupled between the power adapter and the power bus in parallel with the full-power mechanism, wherein the low-power mechanism supplies power for the power consumers while the computer system is operating in a low-power mode, and wherein the low-power mechanism comprises a switching element coupled in series with a voltage-reduction mechanism that reduces the voltage to a level suitable for the power consumers;

wherein the full-power mechanism and the low-power mechanism are both enabled for a predetermined range of an output current while supplying power to the power consumers, and wherein, as the computer system transitions from the low-power mode to the full power mode, the low-power mechanism is disable upon detecting that the output current is at a first predetermined threshold current within the range.

10. The computer system of claim 9, wherein the low-power mechanism comprises a buck converter, a boost converter, a single-ended primary inductor converter (SEPIC), or another switched-mode power supply.

11. The computer system of claim 9, wherein the switching element includes at least one of a MOSFET transistor, a bipolar junction transistor, a mechanical switch, or another type of switching element.

12. The computer system of claim 9, wherein the low-power mechanism comprises a diode in series with the voltage-reduction mechanism.

13. The computer system of claim 9, further comprising a control mechanism that asserts a control signal to enable the low-power mechanism when the computer system commences operation in low-power mode and to disable the low-power mechanism when the computer system commences operation in full-power mode.

14. The computer system of claim 13, wherein the control mechanism asserts a second control signal to disable the full-power mechanism when the computer system commences operation in low-power mode and to enable the full-power mechanism when the computer system commences operation in full-power mode.

15. The computer system of claim 9, further comprising:
a voltage-sensitive mechanism on the output of the full-power mechanism;
wherein when supplying power for the power consumers, the low-power mechanism outputs a predetermined voltage on the power bus; and
wherein upon detecting the predetermined voltage, the voltage-sensitive mechanism disables the full-power mechanism.

16. A circuit for supplying power, comprising:
a full-power mechanism coupled to an input and an output for the circuit, wherein the full-power mechanism is configured to provide power with high power conversion efficiency in a range of full-power output currents;
a low-power mechanism coupled in parallel with the full-power mechanism, wherein the low-power mechanism is configured to provide power with high power conversion efficiency in a range of low-power output currents;
wherein the low-power mechanism is enabled when the circuit is outputting low-power output currents and disabled when the circuit is outputting full-power output currents, and wherein the low-power mechanism comprises a switching element coupled in series with a voltage-reduction mechanism that reduces the voltage to a level suitable for the power consumers; and wherein the full-power mechanism is enabled when the circuit is outputting full-power output currents and disabled when the circuit is outputting low-power output currents;
wherein the full-power mechanism and the low-power mechanism are both enabled for a predetermined range of an output current while supplying power to the power consumers, and wherein, as the computer system transitions from the low-power mode to the full power mode, the low-power mechanism is disabled upon detecting that the output current is at a first predetermined threshold current within the range.

17. The circuit of claim 16, wherein the full-power mechanism is a buck converter.

18. The circuit of claim 16, wherein the low-power mechanism comprises a buck converter, a boost converter, a single-ended primary inductor converter (SEPIC), or another switched-mode power supply.

19. The circuit of claim 16, wherein the switching element includes at least one of a MOSFET transistor, a bipolar junction transistor, a mechanical switch, or another type of switching element.

20. The circuit of claim 16, wherein both the low-power mechanism and the high-power mechanism are enabled in the predetermined range of the output current between the range of low-power output currents and the range of full-power output currents.

21. The circuit of claim 16, further comprising:
a voltage-sensitive mechanism on the output of the full-power mechanism;
wherein when providing power, the low-power mechanism outputs a predetermined voltage; and
wherein upon detecting the predetermined voltage, the voltage-sensitive mechanism disables the full-power mechanism.

22. A method for supplying power in a computer system that supports operating in a full-power mode and a low-power mode, comprising:
operating in full-power mode, wherein operating in the full-power mode involves disabling a low-power mechanism and supplying power to a set of power consumers coupled to a power bus in the computer system using a full-power mechanism; and
upon commencing operation in low-power mode, disabling the full-power mechanism and supplying power to the set of power consumers using the low-power mechanism, wherein the low-power mechanism comprises a switching element coupled in series with a voltage-reduction mechanism that reduces the voltage to a level suitable for the power consumers;
wherein the full-power mechanism and the low-power mechanism are both enabled for a predetermined range of an output current while supplying power to the power consumers, and wherein, as the computer system transitions from the low-power mode to the full power mode, the low-power mechanism is disabled upon detecting that the output current is at a first predetermined threshold current within the range.

* * * * *